(12) United States Patent
De Vaan et al.

(10) Patent No.: US 7,121,668 B2
(45) Date of Patent: Oct. 17, 2006

(54) DEVICE AND METHOD FOR GENERATING AN IMAGE FOR PROJECTION

(75) Inventors: Adrianus Johannes Stephanes Maria De Vaan, Eindhoven (NL); Peter Luerkens, Aachen (DE); Gerardus Johannes Josephus Vanlier, Eindhoven (NL); Adrianus Johannes Frensch, Eindhoven (NL); Henricus Wilhelmus Johannes Van Den Wildenberg, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 130 days.

(21) Appl. No.: 10/503,249

(22) PCT Filed: Jan. 27, 2003

(86) PCT No.: PCT/IB03/00244

§ 371 (c)(1),
(2), (4) Date: Aug. 2, 2004

(87) PCT Pub. No.: WO03/067897

PCT Pub. Date: Aug. 14, 2003

(65) Prior Publication Data

US 2005/0088622 A1    Apr. 28, 2005

(30) Foreign Application Priority Data

Feb. 5, 2002 (EP) ................. 02075472

(51) Int. Cl.
*G03B 21/14* (2006.01)
*G09G 5/00* (2006.01)
*G09G 3/36* (2006.01)
*G02F 1/1335* (2006.01)
*H04N 9/12* (2006.01)
*H04N 5/64* (2006.01)
*G02B 26/08* (2006.01)

(52) U.S. Cl. ............................ 353/69; 359/20; 359/33; 359/84; 359/618; 359/204; 345/32; 345/87; 345/3.1; 349/5; 349/193; 348/743; 348/756; 348/751; 348/766

(58) Field of Classification Search ................ 353/69, 353/31, 20, 33–34, 81, 84; 345/32, 87, 3.1; 349/5, 193; 348/743–744, 37, 756, 771, 348/751, 761, 766, 790; 359/196–197, 618, 359/204
See application file for complete search history.

(56) References Cited

U.S. PATENT DOCUMENTS

| | | | | |
|---|---|---|---|---|
| 5,410,370 A | * | 4/1995 | Janssen | 348/756 |
| 5,416,514 A | * | 5/1995 | Janssen et al. | 348/196 |
| 6,683,658 B1 | * | 1/2004 | Janssen | 348/760 |
| 6,690,432 B1 | * | 2/2004 | Janssen et al. | 348/744 |
| 6,932,477 B1 | * | 8/2005 | Stanton | 353/31 |

* cited by examiner

Primary Examiner—W. B. Perkey
Assistant Examiner—Magda Cruz

(57) ABSTRACT

In an image projection device, interferences between the light source and the light modulator leading to visible interferences in the projected image are suppressed by an interference cancellation circuit that pre-corrects the control signal that includes the image data that is to be projected.

10 Claims, 2 Drawing Sheets

DEVICE AND METHOD FOR GENERATING AN IMAGE FOR PROJECTION

Figure 1:
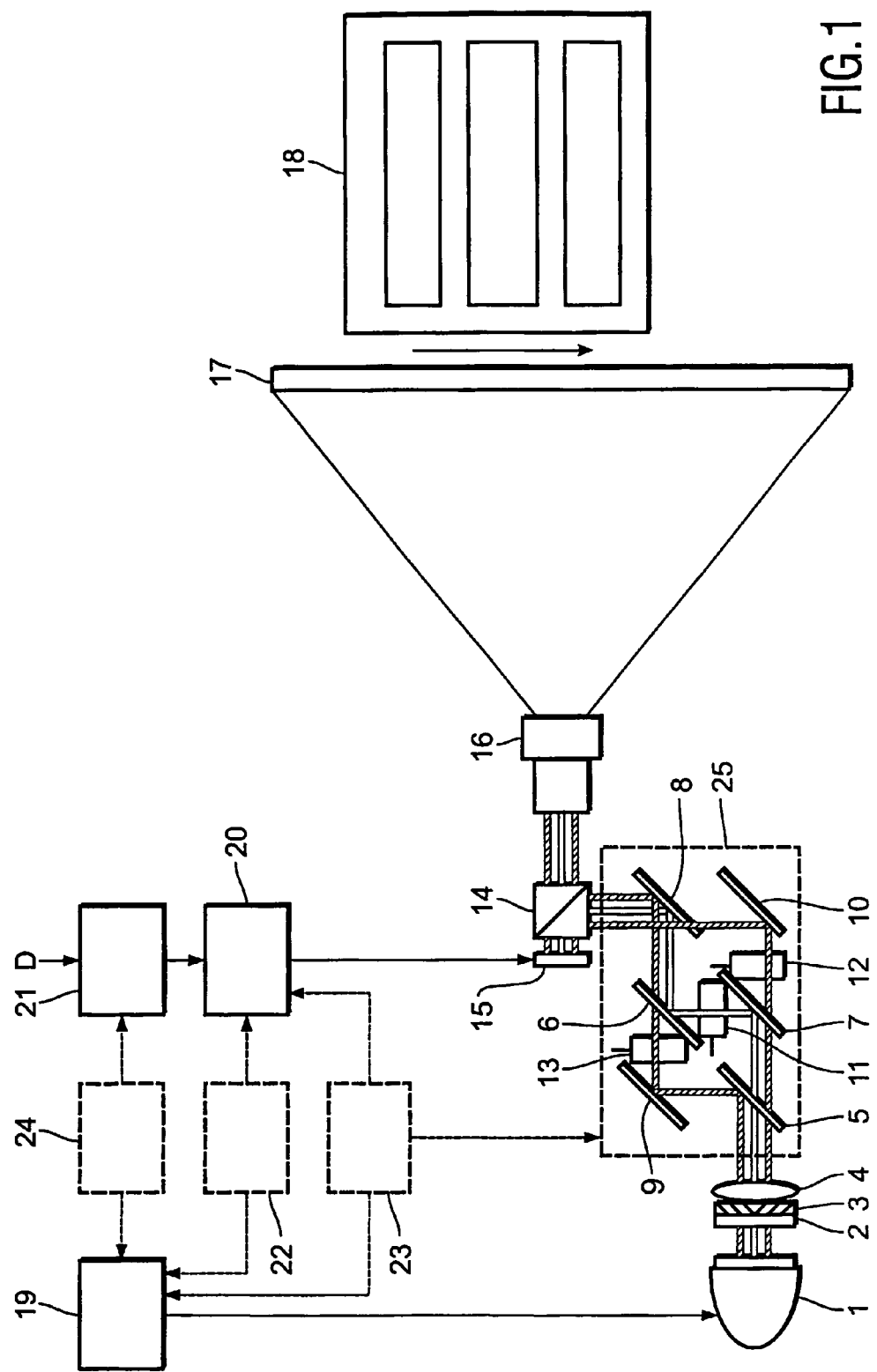

The invention relates to a device for generating an image for projection, the device comprising a light source, a light source drive unit, electro-optical light modulation means including color scanning means for simultaneously generating scrolling image parts of different colors, image projection means for projecting the image by using said scrolling image parts and a projection drive unit for controlling said image projection means by a control signal including the image data to be projected. The invention also relates to a corresponding method of generating an image for projection.

A device and a method of this kind are described in U.S. Pat. No. 5,532,763. Such color scanning means, wherein the three main colors red, green and blue are scanned across the display panel simultaneously so that they illuminate different areas on the panel at the same time, allow low-cost projection solutions and are therefore useful for consumer applications. In these applications, miniaturization, low costs and long lifetimes are of major importance.

As a light source, an Ultra High Pressure (UHP) projection lamp described in, for example, WO 00/38481 A1, is often used. When using such a UHP lamp, however, a pulse on the lamp current is used to shape the electrodes in such a way that the lamp arc remains at a stable position. This lamp pulse interferes with said color scanning means and produces interference patterns which become visible in the projected image.

It is therefore the object of the present invention to provide a solution to the above-described problem, i.e. a solution which reduces or completely avoids the generation of such interference patterns.

This object is achieved according to the present invention by a device as defined in claim 1 which is characterized by an interference cancellation circuit for pre-correcting said control signal, such that interferences between said light source and said light modulation means leading to visible interferences in the projected image are suppressed.

A corresponding method of solving the above object is defined in claim 10. Preferred embodiments of the invention are defined in the dependent claims.

The invention is based on the idea to suppress the interference pattern by correcting the information that is written to the image projection means, particularly to a display panel included therein. The data stream provided to the projection drive unit for controlling said image projection means is thus pre-corrected according to the present invention so that the interference patterns become at least unnoticeable or are completely avoided.

According to a first aspect of the invention, a first synchronization unit is provided to synchronize said light source drive unit, said projection drive unit and said image projection means. Furthermore, said interference cancellation circuit is adapted to lower the color values on locations where the corresponding color intensities are increased. The synchronization is preferably adapted in such a way that the interference pattern will be (perceptibly) stationary on a display. Then, the control signal is corrected by lowering the color, i.e. the red, green and blue values at those locations on the display where its corresponding red, green and blue light intensity are increased due to the higher light source output intensity caused by the lamp pulse. In such a way, the light intensities of the individual projected pixels are averaged over time, such that the interference pattern is compensated and its visibility is drastically reduced.

According to another aspect of the invention, a second synchronization unit is provided to synchronize said light source drive unit and said electro-optical light modulation means, such that an interference pattern is generated. Furthermore, said interference cancellation circuit is adapted to generate an additional moving waveform on the projected image, which additional waveform is selected to compensate said interference pattern. The additional waveform interferes with the interference pattern which is to be compensated. To achieve the desired compensation, the additional waveform is selected appropriately, e.g. is selected in such a way that the resulting light-intensities over time are averaged. The speeds of the interference patterns are advantageously selected so that the human eye is not able to trace the moving patterns.

According to still another aspect of the invention, a third synchronization unit is provided to synchronize said interference cancellation unit with said light source drive unit. Alternatively, a detector that detects the increased intensities in the illumination window and drives a proper setting of the interference cancellation unit may also be provided. The advantage of said synchronization is that the interference pattern can be made stationary on the screen, such that driving a pre-corrected value to each pixel in a display can exactly compensate the interference patterns.

According to a preferred embodiment, said image projection means comprise a single display that is driven by said projection drive unit. Preferred embodiments of such a single display are defined in dependent claims 6 to 8. The single display is thus preferably realized by a single-panel reflective liquid crystal on silicon (LCoS) display, a single-panel reflective DMD display or a single-panel transmissive liquid crystal display. Such an LCoS display is particularly described in Society of Information Display, 2001 International Symposium, Digest of Technical Papers, Volume XXXII, San Jose Convention Center, San Jose, Calif., Jun. 5–7, 2001, Pages 1072–1075: 40.1: Invited paper: Scrolling Color LCOS for HDTV Rear Projection, Jeffrey A. Shimizu. Such displays are much more efficient and easier to produce, thus lowering the overall costs of a projection device.

Preferably, said light source includes a small-sized ultra-high pressure projection lamp having a high luminance and a long life.

Figure 2:
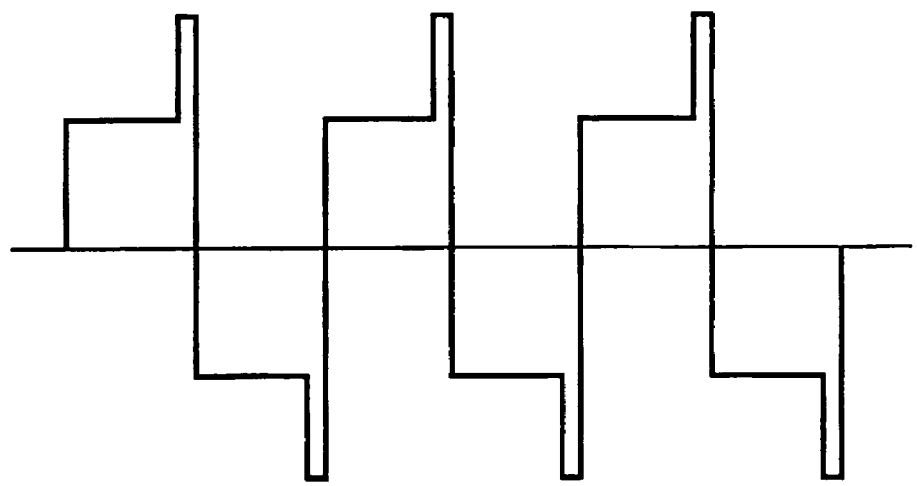
Figure 3:
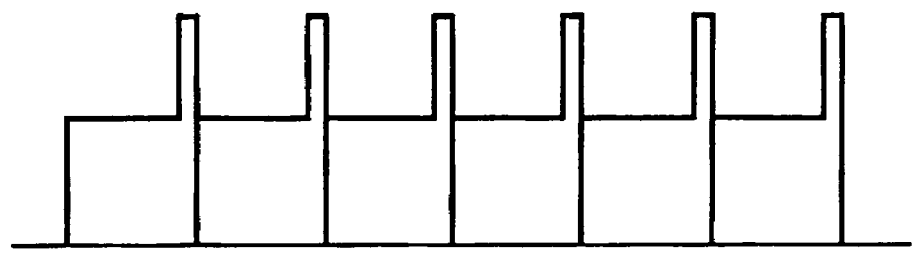

The invention will now be explained in more detail with reference to the drawings, in which FIG. 1 shows a device for generating an image for projection according to the present invention, FIG. 2 shows the typical waveform for UHP lamps having pulsed arc stabilization, and FIG. 3 shows the typical lamp flux output for pulse-stabilized UHP lamps.

The device according to the present invention shown in FIG. 1 comprises a UHP lamp 1 as light source, a polarization conversion system (PCS) 2, an Integrator 3 for beam shaping and averaging, and a lens 4. The UHP lamp generates white light of a high luminance which is provided to electro-optical light modulation means 25. Said light modulation means 25 comprise color separation filters 5, 6, color fusion filters 7, 8, deflection mirrors 9, 10 and rotating prisms 11, 12, 13, jointly forming a color scanner for simultaneously generating scrolling image parts, particularly scrolling bars, of different colors. The light, i.e. the image parts, outputted from said color scanner are thereafter inputted to a polarizing beam splitter (PBS) 14, e.g. a prism, for reflecting the light onto an LCoS display 15. After passing the PBS 14, the light reflected from said reflective LCoS display 15 is subsequently projected onto a screen 17 or the wall via a projection lens 16.

The color scanner of the electro-optical light modulation means 25 uses a technique wherein the three colors, i.e. red, green and blue, are scanned across the display panel 15 simultaneously so that they illuminate different areas on the panel 15 at the same time. Preferably, rectangular bars as denoted by reference numeral 18 having different colors are scanned simultaneously in vertical direction across the panel. This has the advantage that with parts of the red, blue and green light on the panel simultaneously, rather than whole single color images sequentially, none of the colors is ever blocked from the panel so that the system can theoretically achieve a brightness that equals the brightness of a three-panel system. By sweeping the color bars at a high speed across the display, the viewer's perception of color break-up is greatly reduced to an acceptable level.

The LCoS display 15 uses silicon as an active substrate, on which aluminum pixels are patterned. Thus, the silicon chip serves as both the active matrix and the reflective layer. The electronic circuits that drive the formation of the image are patterned into the chip, which is coupled with a planar reflective surface. The driver electronics, i.e. the wiring used to access each individual pixel element, are hidden behind the pixels to avoid light blockage. Thus, the reflective surface occupies about 95% of the display area.

For driving the UHP lamp 1, a lamp drive unit 19 is provided. Similarly, for driving the LCOS display 15, a projection drive unit 20 for providing the display 15 with the information about the images to be projected is provided. To stabilize the arc position of the UHP lamp 1, an additional pulse is used on the lamp current. The typical lamp current for such a UHP lamp 1 including the pulse on the current for arc position stabilization is shown in FIG. 2. FIG. 3 shows the corresponding lamp flux from the projection lamp.

It has been noticed that this lamp pulse interferes with the color scanner, such that interference patterns become visible in the projected image. To correct these interference patterns, an interference cancellation circuit 21 is provided. Said interference cancellation circuit 21 receives the data stream D including the information about the images to be projected, pre-corrects said data stream D and provides the pre-corrected data stream to the projection drive unit 20 wherein said pre-correction is made, so that the interference patterns become unnoticeable or are even fully suppressed. This suppression can be achieved in different ways. Preferred ways will be explained hereinafter.

According to a first method, a first synchronization unit 22 is provided to synchronize the display 15 or its drive unit 20, the color scanner 25 and the lamp drive unit 19, such that the interference pattern will be (perceptibly) stationary on the display 15. Next, the control signal to the display 15 is corrected by the interference cancellation circuit 21 by lowering the red, green and blue values at those locations on the display 15 where its corresponding red, green and blue light intensity are increased due to the higher lamp output intensity caused by the lamp pulse. In such a way, the light intensities of the individual projected pixels are averaged over time so that the interference pattern is compensated and its visibility is drastically reduced. Some residual lines might still remain visible. The visibility of these residual lines can be further reduced by using a second method.

According to said second, further improved method, which can be applied separately or in addition to the first method described above, a second synchronization unit 23 is provided to synchronize the lamp pulse (i.e. the lamp drive unit 19) and the projection drive unit 20, such that its interference pattern starts moving across the image plane. The interference cancellation circuit 21 is used to introduce an extra moving waveform within the projected image. This extra waveform interferes with the interference pattern which is to be compensated and is selected in such a way that it compensates said interference pattern by averaging the resulting light-intensities over time. The speeds of the interference patterns are selected in such a way that the human eye is not able to trace the moving patterns.

The lamp drive unit 19 is preferably synchronized with the interference cancellation unit 21 by a third synchronization unit 24, particularly for synchronization with the additional lamp current pulse. However, it is also possible to provide a detector that detects the increased intensities in the illumination window and drives a proper setting of the interference cancellation unit.

The invention claimed is:

1. A device for generating an image for projection, the device comprising:
    a light source,
    a light source drive unit,
    electro-optical light modulation means including color scanning means for simultaneously generating scrolling image parts of different colors,
    image projection means for projecting the image by using the scrolling image parts,
    a projection drive unit for controlling the image projection means by a control signal including the image data to be projected, and
    an interference cancellation circuit for pre-correcting the control signal, such that interferences between the light source and the light modulation means leading to visible interferences in the projected image are suppressed.

2. The device of claim 1, wherein a first synchronization unit is provided to synchronize the light source drive unit, the projection drive unit and the image projection means, and in that the interference cancellation circuit is adapted to lower color values at locations where corresponding color intensities are increased.

3. The device of claim 1, wherein a second synchronization unit is provided to synchronize the light source drive unit and the electro-optical light modulation means, such that an interference pattern is generated, and in that the interference cancellation circuit is adapted to generate moving waveform on the projected image, which waveform is selected to compensate the interference pattern.

4. The device of claim 3, wherein a third synchronization unit is provided for synchronization of the interference cancellation unit with the light source drive unit.

5. The device of claim 1, wherein the image projection means comprise a single display that is driven by the projection drive unit.

6. The device of claim 5, wherein the single display is a single-panel reflective liquid crystal on silicon display.

7. The device of claim 5, wherein the single display is a single-panel reflective DMD display.

8. The device of claim 5, wherein the single display is a single-panel transmissive liquid crystal display.

9. The device of claim 1, wherein the light source includes an ultra-high-pressure projection lamp.

10. A method of generating an image for projection, comprising:
    modulating light from a light source to simultaneously generate scrolling image parts of different colors,
    projecting the image using the scrolling image parts,
    controlling the projecting based on a control signal that includes the image data to be projected, and
    pre-correcting the control signal to suppress visible interferences in the projected image caused by the modulating of the light from the light source.

* * * * *